Patented Nov. 28, 1933

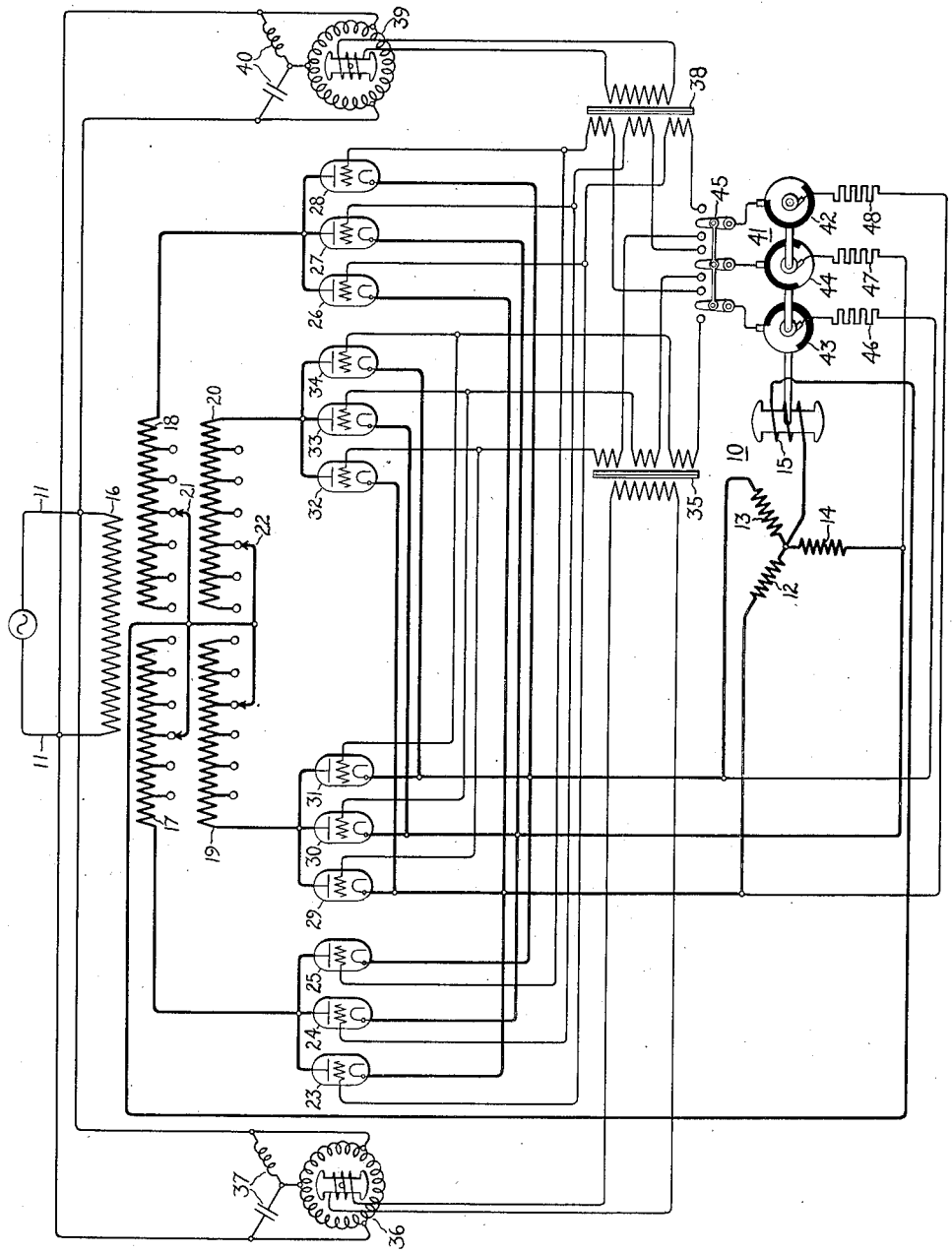

1,937,371

UNITED STATES PATENT OFFICE 1,937,371

METHOD AND APPARATUS FOR OPERATING A MOTOR OR OTHER LOAD DEVICE FROM AN ALTERNATING CURRENT CIRCUIT

Clodius H. Willis, Princeton, N. J., and Charles W. Stone, Schenectady, N. Y., assignors to General Electric Company, a corporation of New York Application March 12, 1932. Serial No. 598,521

5 Claims. (Cl. 172—274)

Our invention relates to a method of and apparatus for operating a motor or other load device from an alternating current circuit, and more particularly to such a method and apparatus utilizing electric valves in which the voltage applied to a load circuit may be smoothly varied within predetermined limits.

Heretofore there have been proposed numerous arrangements including electric valves for operating an alternating current motor from an alternating current circuit. In certain of these arrangements a reduced voltage for starting and operating the motor under low speed conditions has been obtained by applying to the control grids of the electric valves an alternating potential retarded in phase. When operating in this manner, however, the power factor of the current drawn from the alternating current circuit is very low and the wave form is poor. On the other hand, the use of a tap changing transformer for reducing the load voltage under starting conditions involves a periodic opening of the power circuit and a step-by-step increase of the load voltage, which under certain conditions, is very unsatisfactory.

It is an object of our invention, therefore, to provide an improved method of and apparatus for operating a motor or other load from an alternating current circuit which will overcome the above mentioned disadvantages of the arrangements of the prior art and which will be simple and reliable in operation.

It is another object of our invention to provide an improved method of and apparatus for operating an electric motor or other load from an alternating current in which the load voltage may be smoothly varied within predetermined limits and which avoids an opening of the power circuit.

It is a further object of our invention to provide an improved method of and apparatus for operating an electric motor or other load from an alternating current circuit in which a reduced voltage may be applied to the load circuit and a current of substantially unity power factor drawn from the alternating current supply circuit.

In accordance with one embodiment of our invention an electric motor is adapted to be energized from an alternating current supply circuit through two groups of electric valves, each group of electric valves being connected to an alternating current circuit through a separate transformer winding provided with a plurality of terminals of intermediate potential. The control grids of each group of valves are arranged to be energized from an independent phase shifting circuit in order to control the conductivities of the valves. When it is desired to start the motor, one group of valves is connected to its respective winding for operating on a lower voltage tap, and the grids of this group of valves are excited to render them conducting. The winding associated with the other group of valves is connected for operation on the next succeeding voltage tap and at the same time the grid excitation of the valves associated with this latter winding is retarded until the effective voltage impressed by this winding and its associated group of valves is equal to that of the active winding. By slightly advancing the phase of the grid excitation of this latter group of valves, the load is transferred from the first to the second winding and the first winding may be disconnected and reconnected for operation on the next higher voltage tap, the phase of the grids of the valves associated therewith being simultaneously retarded. In this manner the voltage applied to the load may be successively and uniformly increased throughout the range of operation.

For a better understanding of our invention, together with other and further objects thereof, reference is had to the following description taken in connection with the accompanying drawing, and its scope will be pointed out in the appended claims. The single figure of the drawing illustrates an arrangement embodying our invention for operating a three-phase alternating current motor of the synchronous type at variable speed from a source of single phase alternating current.

Referring now to the drawing, there is illustrated an arrangement for operating at variable speed a three-phase alternating current motor 10 from a single phase alternating current circuit 11. The motor 10 may be of any of the several types well known in the art, but we have illustrated by way of example, a three-phase alternating current motor of the synchronous type comprising three armature phase windings 12, 13 and 14, and a field winding 15. This apparatus includes a transformer comprising a primary winding 16 connected to the alternating current circuit 11 and two pairs of cooperating windings 17 and 18, and 19 and 20, respectively, each provided with a plurality of terminals of intermediate potential. The connections 21 and 22 cooperate with the pairs of windings to connect them for operation at the voltage of the intermediate taps and are connected together to form a common neutral for the four windings 17-20, inclusive. The outer terminals of the windings 17, 18, 19 and 20 are connected to the several phase windings of the motor 10 through the groups of valves 23, 24 and 25, 26, 27 and 28, 29, 30 and 31, and 32, 33 and 34, respectively. Each of the valves 23-34, inclusive, is provided with an anode, a cathode and a control grid and may be of any of the several types well known in the art, although we prefer to use electric valves of the vapor electric discharge type because of the relatively large amounts of power which may be handled at ordinary operating voltages. In order to control the conductivity of the valves associated with the cooperating windings 17 and 18, there is provided a grid transformer 35 provided with a plurality of secondary windings for exciting the grids of the several valves having independent cathode potentials. The primary winding of the transformer 35 is adapted to be energized from the alternating current circuit 11 through any suitable phase shifting device, such for example, as a rotary phase shifting transformer 36 connected to the circuit 11 through a phase splitting circuit 37. Similarly, the valves associated with the cooperating windings 19 and 20 are energized from the grid transformer 38, the primary winding of which is connected to a rotary phase shifting transformer 39 energized from the circuit 11 through a phase splitting circuit 40. In order to selectively energize the several phase windings 12, 13 and 14 in accordance with the position of the field winding, illustrated in the present case as the motor rotor, so that only that phase winding will be energized which is in a torque producing position relative to the rotor, there is provided a distributor 41 driven from the shaft of the motor and provided with sections 42, 43 and 44, connected in the grid circuits of the valves associated with the phase windings 12, 13 and 14, respectively. There is illustrated, a two position switch 45 for selectively including the distributor 41 in the grid circuits of the valves assocated with the windings 17 and 18, that is, in series with the secondary windings of the grid transformer 35, or in the grid circuits of the valves associated with the windings 19 and 20, although in some instances it may be desirable to omit this switch and connect the grid circuits of the two groups of valves directly together at the distributor. If desired, current limiting resistors 46, 47 and 48 may be included in the several grid circuits. However, this feature of controlling the conductivity of a group of electric valves by a distributor mechanism driven by a motor energized through the valves forms no part of my present invention, but is disclosed and broadly claimed in a copending application of E. F. W. Alexanderson, Serial No. 638,361, filed May 11, 1923, and assigned to the same assignee as the present application.

In explaining the operation of the above described apparatus, it will be assumed that, initially, the windings 17 and 18 are connected for operation at their lowest voltage; that is, that the connection 21 is made to the outermost intermediate terminal of each winding; that the switch 45 is in its right hand position, and that the motor rotor and distributor 41 are approximately in the positions illustrated. It will also be assumed that the phase shifting transformer 39 is so adjusted that the potentials applied to the valves 23-28, inclusive, are substantially out of phase with their anode potentials. Under these conditions, the motor 10 is deenergized. If now, the potential supplied to the transformer 38 be gradually advanced by means of the phase shifting transformer 39, the valves 23-28 will tend to be excited during the latter portions of their respective half cycles of positive anode potential. However, the grid circuits of all of these valves except valves 25 and 28 are opened at the distributor 41, but the grid circuits of these two valves are completed through the element 43 of the distributor. Under such conditions, the outermost portions of the windings 17 and 18, together with the valves 25 and 28 and their associated grid circuits, comprise a full wave controlled rectifier supplying energy to the phase winding 13 of the motor 10. With the winding 13 energized the rotor will be given a clockwise torque as indicated in the diagram, and will rotate through 120 electrical degrees when the grid circuits of the valves 25 and 28 will be broken through the section 43 of the distributor 41, and the grid circuits of the valves 24 and 27 will be completed through the section 44. The winding 14 of the motor is now energized and produces a torque upon the rotor to cause further rotation. In this manner the distributor 41 selectively controls the conductivity of the several valves of each group connected with the several phase windings of the motor and the motor will accelerate to a speed dependent upon the value of the voltage impressed from the windings 17 and 18. By advancing the phase of the grid potentials through the phase shifting transformer 39 the voltage may be brought up to the maximum value of the particular tap to which connection is made, as will be well understood by those skilled in the art. When this condition is reached the cooperating windings 19 and 20 are connected for operation at the next higher voltage tap through the connection 22, and at the same time the grid potentials of the valves associated with these windings are retarded by means of the phase shifting transformer 36 until the average voltage supplied by these windings with the higher voltage connection is substantially equal to that impressed by the lower voltage tap of the windings 17 and 18. The switch 45 may now be operated to its left hand position and the current supplying the motor 10 will be transferred from the windings 17 and 18 to the windings 19 and 20. By gradually advancing the phase of the potentials of the valves associated with the windings 19 and 20 by means of the phase shifting transformer 36 the average voltage is increased and the speed of the motor increased correspondingly. In this manner, the motor load may be switched back and forth between the pairs of windings 17 and 18, and 19 and 20, and the voltage applied to the motor, and hence the speed of the motor, gradually and uniformly increased throughout the entire range of operation without an interruption of the power circuit. Obviously, it is possible also to operate the motor continuously at any intermediate position. From the above, it is seen that the several windings of the transformer 16, together with their associated valves, comprise a combined rectifier and commutator for the motor 10, and, since the field winding of the motor 10 is connected in series with its armature winding, it will be given characteristics similar to those of a direct current series motor.

While we have illustrated our invention as applied to an arrangement for operating a three-phase alternating current motor from a single-phase source of alternating current, it will be obvious to those skilled in the art that it is equally suitable for the energization of any type of electric load to which it is desired to supply uniformly variable voltage, and that it is equally suitable to the energization of a load from a polyphase alternating current supply circuit.

While we have described what we at present consider the preferred embodiment of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States, is:

1. The method of variably energizing a load from a source of alternating current through a plurality of electric valves and a plurality of inductive windings each provided with a plurality of electrically spaced terminals which comprises energizing said load from a first one of said windings, connecting a second of said windings for operation at a different voltage, controlling the conductivities of said valves until the effective voltages impressed upon said load by said windings are equal, and disconnecting said first winding.

2. The method of energizing a load from a source of alternating current through a plurality of electric valves and a plurality of inductive windings each provided with a plurality electrically spaced terminals which comprises connecting said load to a first one of said windings, decreasing the conductivities of said valves associated with a second of said windings, connecting said latter winding for operation at a voltage higher than that of said first winding, disconnecting said first winding and increasing the conductivities of said valves associated with said second winding.

3. The method of starting an electric motor from a source of alternating current through a plurality of electric valves and a plurality of inductive windings each provided with a plurality of electrically spaced terminals which comprises connecting said motor to a low voltage tap on one of said windings, connecting another winding for operation at a higher voltage, decreasing the conductivity of the valves associated with said latter winding until the effective voltage impressed thereby on said motor equals that of said first mentioned winding, and disconnecting said first mentioned winding.

4. An electric translating circuit comprising an alternating current supply circuit, a load circuit, a plurality of inductive windings each provided with a plurality of electrically spaced terminals, a group of electric valves interconnecting each of said inductive windings with said load circuit, and means for progressively increasing the voltage of said load circuit comprising means for independently controlling the conductivities of said groups of valves, and means for independently varying the connections of said inductive windings.

5. A motor control system comprising an alternating current supply circuit, a motor provided with a plurality of phase windings, a plurality of inductive windings energized from said supply circuit and each provided with a plurality of electrically spaced terminals, a group of electric valves interconnecting each of said inductive windings with the several phase windings of said motor, and means for progressively varying the speed of said motor comprising means for independently controlling the conductivity of said groups of valves and means for independently varying the connections of said inductive windings.

CLODIUS H. WILLIS.
CHARLES W. STONE.